United States Patent [19]
Bostley

[11] 3,791,660
[45] Feb. 12, 1974

[54] DEVICE FOR GRIPPING, DRIVING AND SUPPLYING COOLANT TO A CUTTING TOOL HAVING COOLANT PASSAGES THEREIN

[75] Inventor: Robert J. Bostley, Turners Falls, Mass.

[73] Assignee: The Bendix Corporation, Southfield, Mich.

[22] Filed: Jan. 9, 1973

[21] Appl. No.: 322,272

Related U.S. Application Data

[62] Division of Ser. No. 137,901, April 27, 1971, abandoned.

[52] U.S. Cl. .................................. 279/20, 408/59
[51] Int. Cl. ..................... B23b 31/00, B23b 51/06
[58] Field of Search ...... 279/20; 408/56, 57, 58, 59, 408/60

[56] References Cited
UNITED STATES PATENTS

| | | | |
|---|---|---|---|
| 3,443,819 | 5/1969 | Benjamin et al. | 279/20 |
| 3,024,030 | 3/1962 | Koch | 279/20 |
| 2,937,029 | 5/1960 | Colby | 279/20 |

Primary Examiner—Francis S. Husar
Attorney, Agent, or Firm—John R. Benefiel

[57] ABSTRACT

An oil conduit twist drill series and method of making are disclosed which have a common straight shank in each series and a tang drive so as to minimize machining costs, sealing problems, and eliminate the use of adapters involved with taper shank oil conduit drills and such drills which have varying diameter straight shanks.

2 Claims, 3 Drawing Figures

STEP I
STEP II
STEP III
STEP IV
STEP V

INVENTOR
ROBERT J. BOSTLEY
BY John R. Benefiel
ATTORNEY

DEVICE FOR GRIPPING, DRIVING AND SUPPLYING COOLANT TO A CUTTING TOOL HAVING COOLANT PASSAGES THEREIN

This is a division, of application Ser. No. 137,901, filed Apr. 27, 1971, now abandoned.

BACKGROUND OF THE INVENTION

1. Field of the Invention

This invention concerns twist drills and more particularly oil conduit twist drills.

2. Description of the Prior Art

Oil conduit drills in which passages formed in the drill body are supplied with a coolant/lubricant via a transfer chuck (inducer) during drilling to greatly enhance cutting speeds have long been known in the art, but have yet to be widely used in industry despite the substantial performance advantage they provide. This is the result of the relatively high cost of such drills and related equipment and/or because compromise configurations attempng to lower the costs thereof have failed to provide enough of the potential performance advantages to offer a clear advantage.

The principal approaches to this problem have been:

a. Common taper shank tang drive oil conduit drills. These provide the full performance potential due to the positive tang drive, but are excessively expensive to produce, as the arrangement of the oil feed passages requires two piece construction thereof, and hence also are relatively unavailable in the smaller sizes. Thus the shanks tend to be large and in turn create excessively bulky inducer units.

b. Non-uniform straight shank oil conduit drills with a tang drive. This approach involves standard drill configuration in which the shank diameter varies with the drill size and a split sleeve adapter is used with each drill size to fit the drill to a taper in the inducer unit. This involves the problem of inventorying the adapters and the expense thereof, and in addition such units have proven difficult to seal and also the coolant pressure tends to blow the adapter and drill out of the inducer.

c. Non-uniform straight shank oil conduit drills without a tang drive. This approach uses a universal chuck to grip the varying drill shank diameters, but also involves sealing problems, but primarily results in a loss of performance since a tang drive is not feasible in the universal chuck approach so that the maximum torque which can be applied is sharply limited. Thus the full advantage of oil feed drilling cannot be realized.

Therefore, it is an object of the present invention to provide an oil conduit drill design which provides full realization of these performance advantages without entailing excessive drill fabrication costs or sealing problems, or involving the use of adapter sleeves.

SUMMARY OF THE INVENTION

This and other objects which will become apparent upon a reading of the following specification and claims are accomplished by providing oil conduit drill series which have a common straight shank throughout the series and which utilizes a tang drive.

DETAILED DESCRIPTION

In the following detailed description, specific embodiments will be described and certain terminology will be utilized for the sake of clarity, but it is to be understood that these are merely illustrative and the invention may be practiced in a variety of forms and embodiments.

Figure 1:
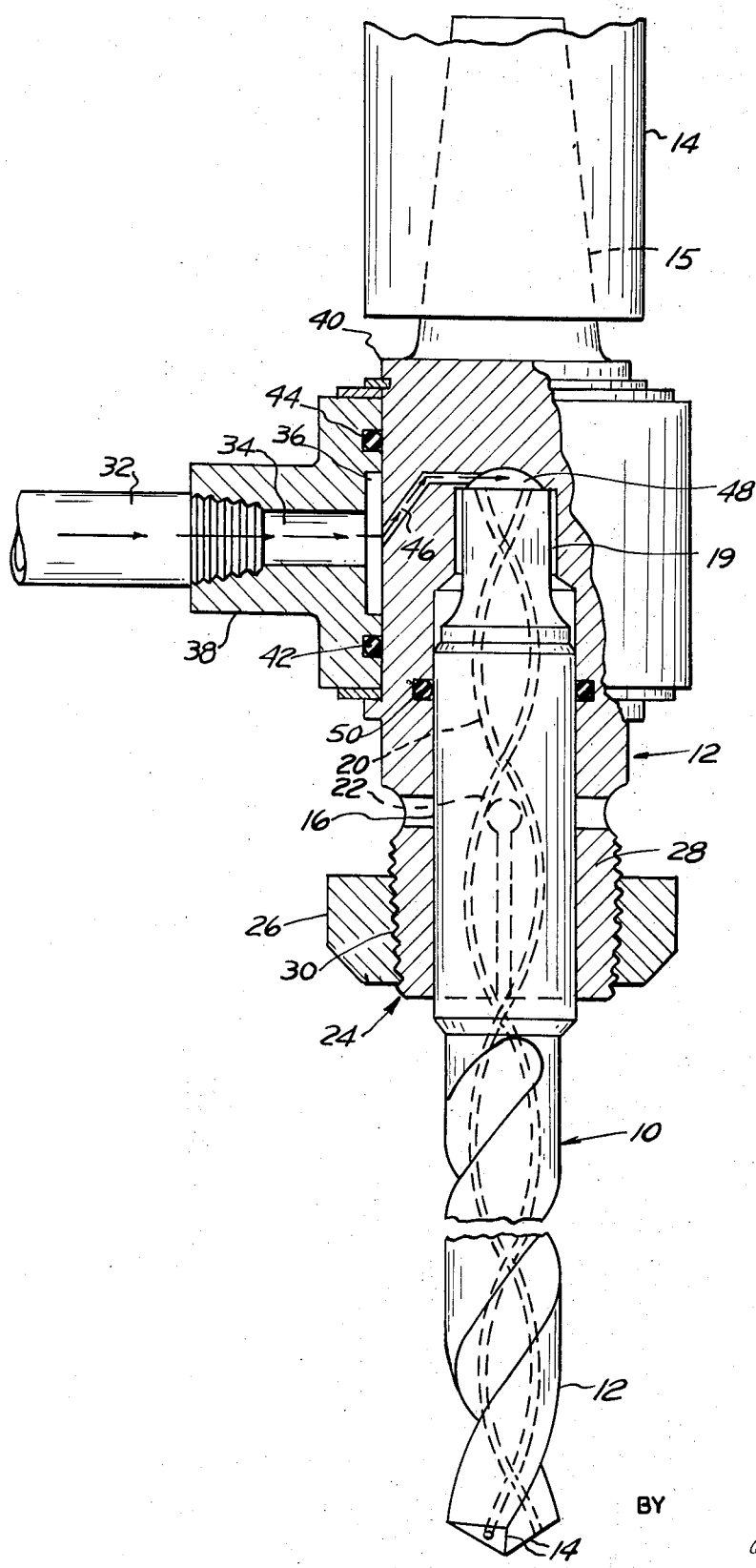
FIG. 1 is a front elevation in partial section of an inducer unit with an installed oil conduit drill according to the present invention.

Referring to the drawings, and particularly FIG. 1, an oil conduit drill 10 according to the present invention is depicted shown installed in an inducer unit 12 which in turn is drivingly connected to a machine spindle 14 via standard taper 15.

The oil conduit drill 10 includes conventional helical flutes 12 and cutting edges 14 formed therein at one end. The shank portion 16 is straight-sided and terminates in a tang 18, seated in a complementarily shaped recess 19 in the inducer 12.

Passing down the length of the oil conduit drill 10 are a pair of oil conduits 20 and 22 opening out on the lower end thereof proximate the cutting edges 14 and at the upper end through the tang 18.

These conduits follow the lands of the helical fluting of the drill 10 so that they folow a spiralled path along the drill axis, in the manner known in the art.

The inducer 12 grips the oil conduit drill 10 on its shank 16 by means of a collet 24 which includes a nut member threaded onto a split sleeve 28 by means of a taper pipe thread 30. By advancing the nut member 26 onto the split sleeve, the segments thereof are forced inwardly to grip the shank 16.

The coolant is supplied from a source (not shown) via line 32 and passage 34 to an annular groove 36 formed in stationary collar 38 which surrounds the rotating inducer body 40 and is sealed by rotary seals 42 and 44.

A supply passage 46 communicates with the annular groove 36 and also with a cavity 48 formed above the recess 19 so as to communicate with the conduits 20 and 22.

The drill 10 is eealed against loss of coolant so supplied by means of a static seal 50 carried by the inducer body 40 engaging the periphery of the shank portion 16.

Figure 2:
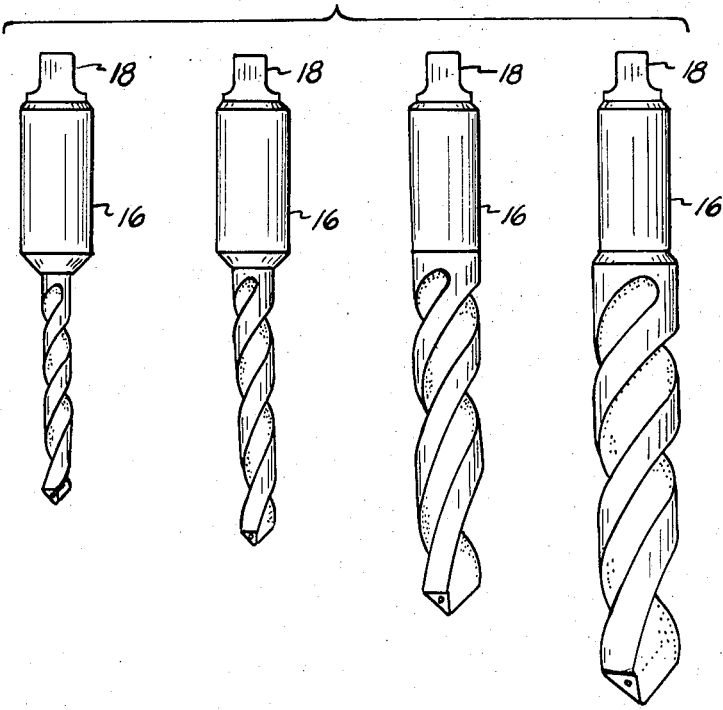
FIG. 2 is a front elevational view of an oil conduit drill series illustrating the common straight shank feature.

Referring to FIG. 2, a series of such drills is shown which illustrates that for a range of drill sizes the straight-sided shank is of a common diameter. As discussed supra, this renders the use of a tang 18 feasible so that the full performance advantages of the oil conduit drill may be realized without exceive costs or sealing problems.

Figure 3:
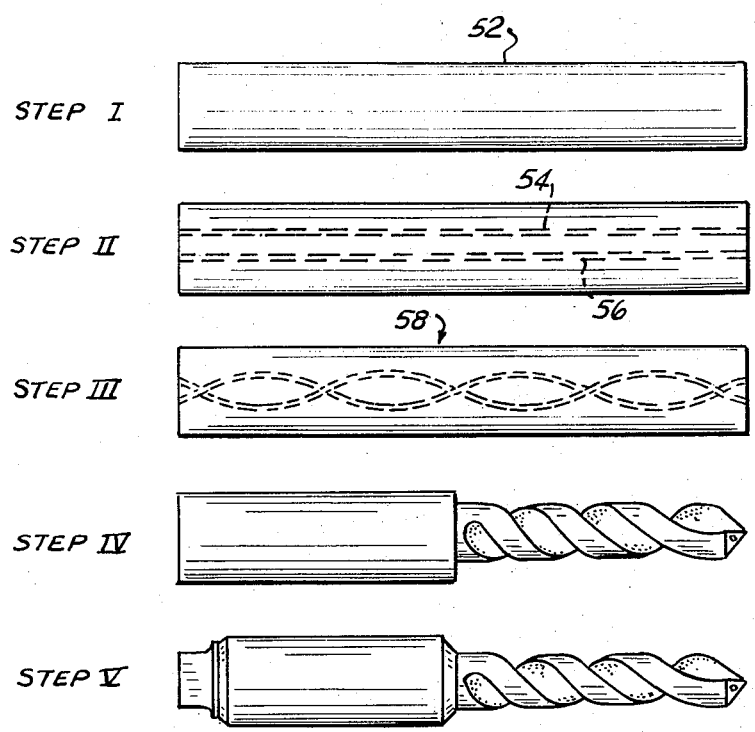
FIG. 3 is a representation of the basic steps in manufacturing an oil conduit drill according to the present invention.

Referring to FIG. 3, the major steps in manufacturing such a drill are depicted, omitting such conventional steps as the various heat treats, peening, etc.

In Step I, a blank 52 of a suitable material of a diameter corresponding to the common straight shank diameter is cut to length, while in Step II, a pair of passages 54 and 56 are formed through the length of the blank 52.

In Step III, the blank 52 is twisted about its own axis so that the passages 54 and 56 spiral about the blank 52 of a proper twist so as to correspond to the helical lands of the drill size to be formed.

It should be pointed out that this process is known in the prior art as disclosed in U.S. Pat. No. 589,576, and stock material having the configuration of the intermediate blank 58 in Step III is commercially available. Hence, a detailed description of this process is deemed necessary.

In Step IV, the drill geometry including the fluting and cutting edges is formed in one end of said blank 58, while in Step V the tang and other geometry is formed to yield the straight-sided shank oil conduit drill according to the present invention.

In forming other drill sizes in the series, the same diameter blank 52 would be used and the shank dimensions and geometry would remain the same with only the drill geometry itself varying through the series.

It has been found that this process also often results in lower manufacturing costs particularly in the smaller drill sizes by virtue of using but a single size blank stock for each series, reducing greatly the number of such blank diameters which must be purchased and inventoried, and hence a further advantage is gained from the configuration according to the present invention.

It is contemplated that several series would be utilized to cover the full range of drill sizes, each series using an inducer sized for the particular series.

While a specific embodiment has been described, the invention is not to be so limited and many variations are of course possible within the scope of the present invention.

What is claimed is:

1. A coolant inducer unit for gripping and driving a cutting tool shank and supplying coolant to passages formed in such cutting tool and opening through the ends of said cutting tool comprising:

an inducer body;

gripping means carried by said inducer body for directly gripping a straight-sided cutting tool shank;

drive means for creating a direct positive drive connection of said unit with a gripped cutting tool including a recess in said unit shaped to cooperate with a positive drive surface formed on the end of a cutting tool shank;

sealing means carried by said inducer body for engaging a cutting tool shank periphery;

coolant supply means for supplying coolant to said passages in such cutting tool including a stationary collar surrounding said inducer body whereby a positive drive connection for a coolant cutting tool is produced without the use of taper shanks or adapter units.

2. The unit of claim 1 wherein said drive means comprises a recess in said unit shaped to cooperate with a tang formed on the end of a cutting tool shank.

* * * * *